United States Patent
Johnson et al.

[15] 3,650,434

[45] Mar. 21, 1972

[54] LIQUID PROPORTIONING DEVICE

[72] Inventors: Jay Johnson, La Canada; Charles R. Gardner, Glendale, both of Calif.

[73] Assignee: Republic Corporation, Century City, Calif.

[22] Filed: Apr. 6, 1970

[21] Appl. No.: 25,964

Related U.S. Application Data

[63] Continuation-in-part of Ser. No. 708,131, Feb. 26, 1968, abandoned.

[52] U.S. Cl. .................................. 222/31, 222/40, 222/57, 222/23
[51] Int. Cl. ....................................................... B67d 5/22
[58] Field of Search .................. 222/57, 40, 31, 23, 134; 137/99; 91/474, 505; 92/84; 310/82; 417/222, 269, 390, 374; 74/60

[56] References Cited

UNITED STATES PATENTS

| | | | |
|---|---|---|---|
| 2,848,139 | 8/1958 | Chiantelassa | 222/134 X |
| 3,010,403 | 11/1961 | Zubaty | 417/269 |
| 2,083,021 | 6/1937 | High | 91/474 X |
| 2,837,105 | 6/1958 | Henke | 137/99 |

Primary Examiner—Stanley H. Tollberg
Assistant Examiner—James M. Slattery
Attorney—Johnston, Root, O'Keeffe, Keil, Thompson & Shurtleff

[57] ABSTRACT

A device for accurately maintaining a constant volumetric proportion between liquids delivered to a mixing point. The device includes means for positively metering the volume of a principal liquid; means for controllably pumping a secondary liquid, means for utilizing the output of the metering apparatus to operate and control the pumping apparatus; means for passing the secondary liquid to and away from the pumping apparatus; means for manually establishing a desired volumetric proportion between the principal and secondary liquids, and means for registering the volume of primary liquid which has passed through the positive metering apparatus. The device is particularly useful in applications wherein the volumetric proportion of a principal liquid to a secondary liquid in a mixture must be accurately controlled.

1 Claims, 3 Drawing Figures

INVENTORS:
JAY JOHNSON
CHARLES R. GARDNER

BY: Johnston, Root, O'Keeffe, Keil, Thompson & Shurtleff
ATT'YS

PATENTED MAR 21 1972
3,650,434
SHEET 2 OF 2
FIG. 2
FIG. 3
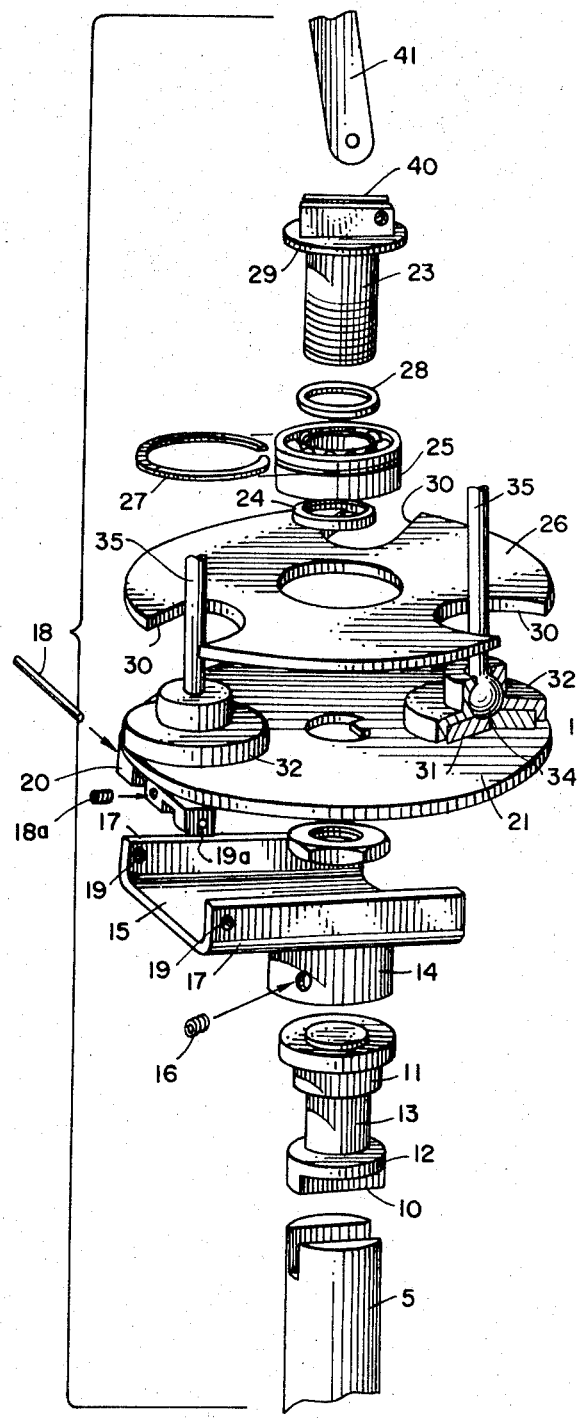
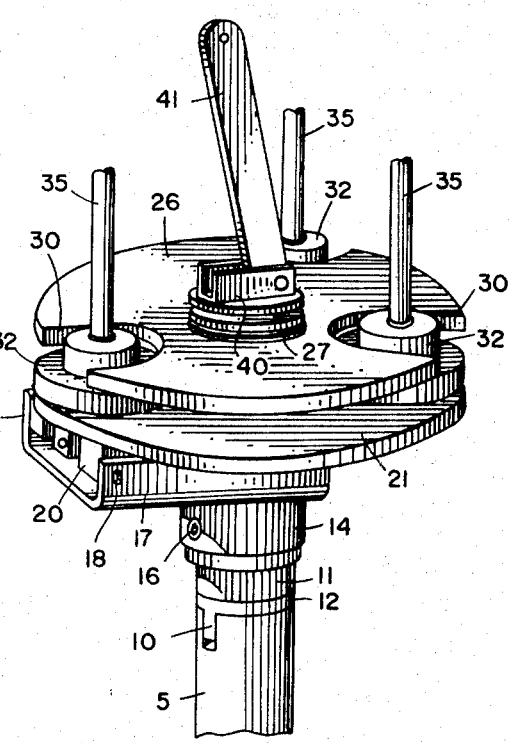
INVENTORS:
JAY JOHNSON
CHARLES R. GARDNER
BY: *Johnston, Root, O'Keeffe, Keil, Thompson & Shurtleff*
ATT'YS 3,650,434

LIQUID PROPORTIONING DEVICE

RELATED APPLICATION

This application is a continuation-in-part of our copending application Ser. No. 708,131, filed Feb. 26, 1968 and now abandoned.

INTRODUCTION

This invention relates to pumping devices and, more particularly, to a controllable pumping device of simplified construction wherein the volume of liquid pumped is proportional to the metered rate of flow of another liquid.

In certain commercial operations, the individual components of a mixture must not only be mixed in exact proportions, but must also be kept separate until just before the mixture is to be used. For example, it is often important that the components of a polyester resin be kept apart from the resin catalyst until just prior to spraying. Consequently, the individual components are usually stored in separate containers and delivered to the mixing point in pipes or hoses. Often, these containers may be located many feet from the mixing point. Furthermore, the individual components usually have different viscosities. As a consequence, the rate of component liquid flow in each delivery conduit to the mixing point may be different, making it difficult or impossible to maintain an accurate and constant volumetric proportion between the component fluids entering the mixture. To compound the problem, the viscosities of the component liquids may vary with temperature, causing the rate of fluid flow within an individual supply line to vary throughout the day. Individual supply line controls have been ineffective to solve these problems and are impractical because of the constant attention required. As indicated above, failure to maintain the proper volumetric proportion of ingredients can result in the loss of the entire batch or mixture being processed, or in the case of sprayed mixtures, the loss of the work in progress. It is, of course, important that mixing devices which maintain a constant volumetric ratio between two materials be of relatively simple construction and yet be reliable.

THE INVENTION HEREIN

It is, therefore, an object of the present invention to provide a controllable pumping device of simplified construction which will accurately maintain a predetermined volumetric proportion between a principal liquid and a secondary liquid, regardless of volumetric changes in the principal liquid.

Another object of the present invention is to provide a controllable pumping device of simplified construction which will eliminate the variations in volumetric proportion between a principal and secondary liquid caused by the protracted distances the liquids travel before reaching the mixing point.

Still another object of the invention is to provide a controllable pumping device of simplified construction which will eliminate variations in volumetric proportions between a principal and secondary liquid caused by changes in the viscosity of the liquids.

Still another object of the invention is to provide a controllable pumping device which can be manually adjusted to establish the desired volumetric proportion between a principal liquid and a secondary liquid.

Other objects will become apparent to those skilled in the art from the following detailed description of the invention.

In general, the present invention consists of a controlled pumping device of simplified design for maintaining a constant volumetric proportion between two or more liquids. In a preferred embodiment of the invention the subject device includes five distinct elements, namely, a positive metering assembly through which passes a principal liquid: a valve and piston type positive displacement pump through which passes a secondary liquid: a wobble plate assembly arranged such that the output of the positive displacement pump is a function of the output of the metering assembly: a volume adjustment control for manually setting the desired volumetric proportion between the principal and secondary liquids: and a register assembly arranged to indicate the volume of principal liquid which has passed through the metering assembly. Other embodiments of the subject invention may be achieved by eliminating one or more of the above described elements.

Under normal operating conditions, a principal liquid is passed, under pressure, to the metering assembly. Assemblies of this type are well known in the art. A motor, included in the metering assembly, rotates in proportion to the volume of principal liquid flowing through the metering assembly. The motor is connected to the wobble plate assembly by means of a drive shaft. The wobble plate assembly, which rotates in synchronism with the drive shaft, also rotates in proportion to the volume of principal liquid flowing through the metering assembly. It is preferred that the metering motor assembly be a positive displacement non-adjustable motor for imparting rotational movement to the shaft in proportion to the volume of liquid pumped by said motor.

In one embodiment of the invention, a piston, which is part of the positive displacement pump, is situated generally above the wobble plate assembly and slidably arranged in a cylindrical chamber. The lower end of the piston is operatively attached to a piston retaining means. The retaining means, which is positioned between two plates of the wobble plate assembly, contacts the upper surface of the revolving lower plate of the wobble plate assembly and the lower surface of the upper plate of the wobble plate assembly. The rotatable lower plate is pivotally mounted at one end and can be raised or lowered. When the lower plate is in the raised position, rotation of the wobble plate assembly causes the lower plate to function as a cam against the lower end of the piston retaining means; thereby urging the piston into the cylindrical chamber. The upper plate, which does not revolve, serves as a positive means for withdrawing the piston from the cylindrical chamber. In the preferred embodiment, a non-revolving notched disc is used as the upper plate. Auxiliary means for withdrawing the piston from the chamber, such as a return spring or the like, can be utilized in conjunction with the upper plate. The positive drive by the wobble plate assembly on both strokes of the piston constitutes the best mode contemplated for the controlled pumping device.

The cylindrical piston chamber communicates with intake and exhaust valves. When the piston is withdrawn from the piston chamber, the exhaust valve is closed and the intake valve is opened. A secondary liquid is drawn through hose or pipe means into an intake port and flows through an intake manifold and the intake valve into the piston chamber. When the piston begins its upstroke, the intake valve closes and the exhaust valve opens. The secondary liquid in the piston chamber is discharged through the exhaust valve into the exhaust manifold, whereupon it is urged into the exhaust port and transmitted, by hose or pipe means, to the mixing point. The above described piston cycle is completed once for every revolution of the wobble plate assembly.

Since the wobble plate assembly rotates in proportion to the volume of principal or primary liquid flowing through the metering assembly, the number of piston cycles, and consequently the volume of secondary liquid pumped, is proportional to the volume of principal liquid flowing in the metering assembly. Therefore, when the present invention is operationally located at or near a mixing point, the volume of secondary liquid delivered to the mixing point will be both directly proportional to the volume of principal liquid delivered to the mixing point and substantially independent of variations due to viscosity, container distance, orifice size, or temperature. An increase or decrease in the rate of flow of the principal liquid caused by viscosity changes, etc., will be compensated for by a corresponding proportional increase or decrease in the volume of secondary liquid pumped. Variations in secondary liquid flow rate caused by viscosity changes, etc., will be eliminated by the positive displacement pump.

The volume adjustment control provides an accurate means for varying the volume of secondary liquid pumped during each revolution of the wobble plate assembly. As previously stated, the lower wobble plate, which is pivotally mounted at one end may be raised or lowered. In the lowered position, a plane through the lower plate will be substantially horizontal. In the raised position, a plane through the lower wobble plate will form an angle with the horizontal. The lower wobble plate is operatively connected, by means of a vertical shaft and a pivot linkage, to the volume adjustment control and also to a register assembly. Manual rotation of a volume adjustment control raises the shaft and causes the lower wobble plate correspondingly, to be raised or to be lowered. The wobble plate lifting means is preferably a coaxially arranged means for changing the tilt of the wobble plate. The angular position of the lower wobble plate determines the length of the piston stroke. When the lower wobble plate is in the horizontal or lowered position, the piston will not be urged into the piston chamber. When the lower wobble plate is in its maximum angular position above the horizontal, the length of the piston stroke will also be maximum. The volume of secondary liquid pumped during each revolution of the wobble plate assembly is a function of the length of the piston stroke and, therefore, a function of the angular position of the lower wobble plate. Consequently, the volume of the secondary liquid pumped during each revolution of the wobble plate assembly is determined by the setting of the volume adjustment control.

The register assembly, which consists of a register of conventional design and a register drive shaft, provides a convenient means for registering the volume of principal liquid which passes through the metering assembly. The register drive shaft is operatively connected to the wobble plate assembly. Since the wobble plate assembly rotates in proportion to the volume of principal liquid flowing through the metering assembly, the register drive shaft will also rotate in proportion to the amount of principal liquid passing through the metering assembly. Rotation of the register drive shaft causes a corresponding volume indication to appear in the register. Consequently, the volume of principal liquid passes through the metering assembly, as measured by the number of rotations of the wobble plate assembly, is indicated on the face of the register.

While the present invention will finds its greatest application in accurately controlling the volumetric proportion of liquid ingredients used in a manufacturing or spraying process, other applications are also obvious. For example, the present invention can be used to accurately control the amount of liquid chlorine used in the chlorination of swimming pools and water supplies. Liquid chlorine would be pumped via the controlled positive displacement pump to a mixing point in direct proportion to the volume of water passing through the metering assembly.

Similarly, the present invention can also be utilized effectively in proportioning insecticide mixtures. In an insecticide spraying application, water or some other carrier would be transmitted under pressure through the metering assembly to a mixing point, spray gun or holding tank. The insecticide component would be delivered to the positive displacement pump assembly, and pumped to the mixing point or spray gun in direct proportion to the volume of water or other carrier flowing through the metering assembly.

Other uses of the subject invention contemplate series or parallel combinations of controlled pumping devices in applications where more than one primary or more than one secondary fluid is to be pumped simultaneously. Similarly, various combinations of controlled pumps may be used where pumping capacities are desired which exceed the pumping capacity of a single controlled pump.

DESCRIPTION OF THE DRAWINGS

A preferred embodiment of the invention is illustrated in the drawings, wherein:

FIG. 2 is an exploded, perspective view of the rotatably driven wobble plate and its associated drive mechanism; and FIG. 3 is a perspective view of the wobble plate and said associated mechanism in assembly.

THE PREFERRED EMBODIMENT

Figure 1:
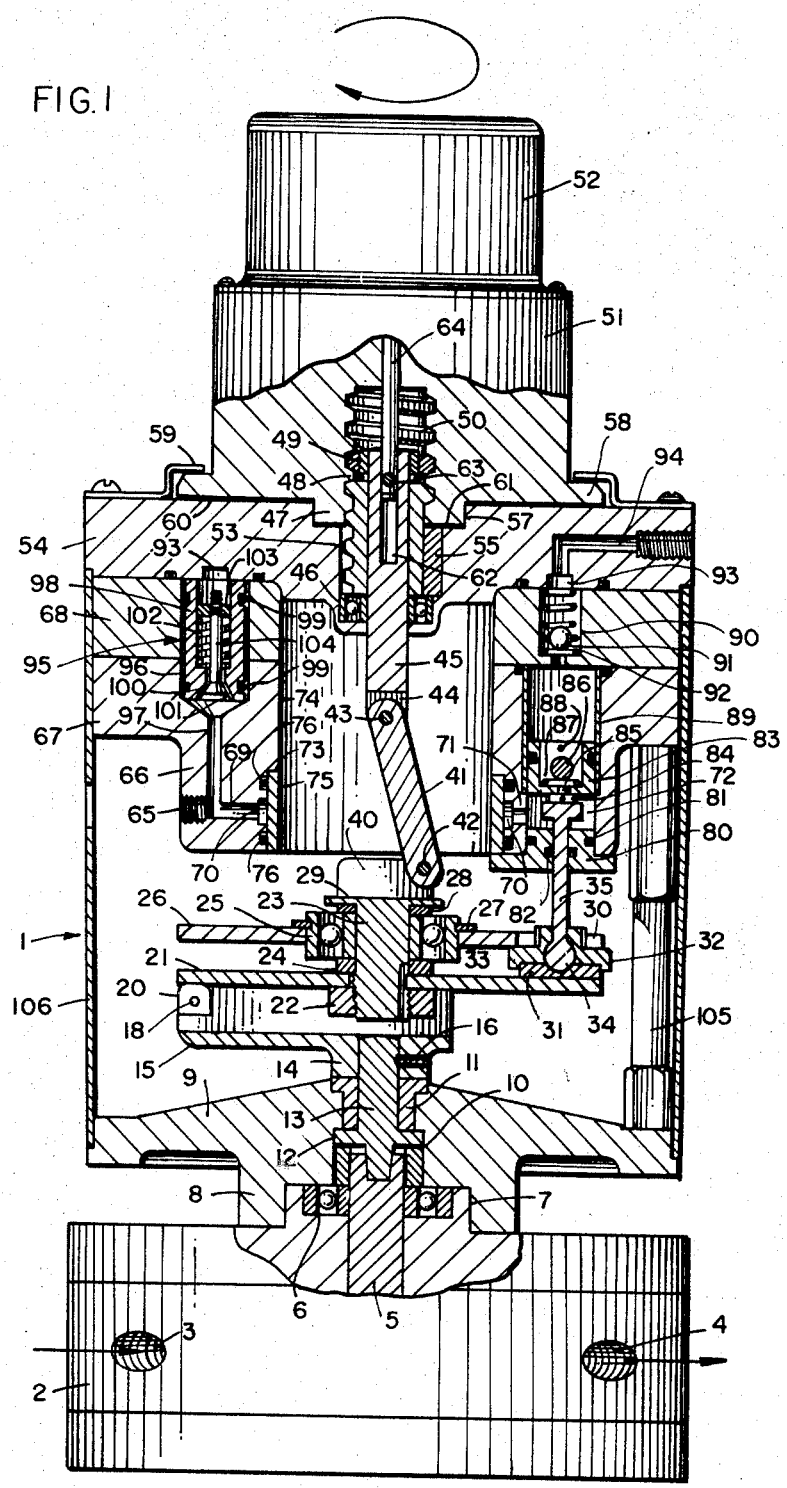
FIG. 1 is a side elevation, partly in diametric cross section, of a proportioning pump with one of the three valve and piston assemblies shown in detail.

The proportionate volume pumping device apparatus is composed of two major components, a secondary fluid pumping unit 1 and a primary fluid metering motor 2, the latter serving as a base for the pumping housing. The metering motor 2 is operated by flow of fluid from an external source under pressure via hose or tube couplings (not shown) into the inlet 3 and out of the outlet 4. The fluid causes the metering motor drive shaft 5 to rotate in proportion to the volume rate of primary fluid flowing through the metering motor 2. The upper end of the shaft 5 is rotatably journaled in the ball bearing 6, which in turn is mounted in the upper face of the upwardly extending, coaxial neck 7 of the pump 2. The depending neck 8 on the bottom of adapter plate 9 of the pumping unit 1 fits over the neck 7 to provide the mounting of the pump housing 1 on the metering motor 2.

A wobble plate drive shaft 13 is coupled to the drive shaft 5 by the spline 10, the latter extending diametrically across the lower face of the drive shaft hub 12. The shaft 13 is rotatably journaled in the housing 11, which in turn is seated coaxially in the circular adapter plate 9.

The hub 14 of a hinge plate 15 is coupled by setscrew 16 for rotation with the shafts 5 and 13. The lower face of hub 14 is borne rotatably on the upper face of bushing 11. The hinge plate 15 is a U-plate having side legs 17 (FIGS. 2 and 3). A hinge pin 18 extends through apertures 19 in the side legs 17 and through apertures 19a in hinge block 20, the latter being fixedly secured to the underface of the wobble plate 21 near its peripheral edge. Hinge block 20 and hinge pin 18 may be held in assembled relationship by the setscrew 18a.

The wobble plate 21 is a disc plate coupled to the retainer clevis 23 by the nut 22 threaded on the lower end thereof and clamping together the wobble plate 21, the bearing ring spacer 24, the inner race of ball bearing 25, and the bearing ring spacer 28 between the head 29 of the clevis 23 and the nut 22. The clevis 23 serves as the coaxial hub of wobble plate 21 and, along with the aforementioned associated parts, rotates coaxially with the wobble plate 21.

The stationary, disc-shaped retainer plate 26 fits about the outer race of the ball bearing 25. It is held against upward displacement by the split snap ring 27 which snaps into an annular groove of the outer ball bearing ring.

This plate 26 has three arcuate notches 30 in the periphery. These notches accommodate respective pistons of three pumping chambers. Each piston has a ball socket glider pad 31 which rests slidably on the upper face of the wobble plate 21. The pads are housed in respective retaining cups 32, the periphery 33 of which is held down positively by the edge portions of notches 30 in the retainer plate 26. The glider pads 31 and their respective retaining cups 32 form a universal joint with the ball end 34 of each piston rod 35.

The degree or amount of reciprocation of each piston rod 35 is dependent upon the amount of angular tilt of the wobble plate 21 and its retainer plate 26. When the wobble plate 21 lies in a plane normal to the axis of rotation of the shafts 5 and 13, it rotates without wobble. Thus no reciprocal drive is imparted by the wobble plate 21 to the piston rods 35. As the wobble plate 21 is tilted about the axis of hinge pin 20, it assumes a rotational wobble action. Each retaining cup 32 and glider pad 31 remains sandwiched between the wobble plate 21 and the retainer plate 26. The retainer plate 26, though it does not rotate, wobbles in parallel orientation with the wobble plate 21. The result is that the piston rod 35 is driven positively on both strokes. Its lowermost position occurs when the portion of the wobble plate 21 above the hinge 20 is beneath the piston rod. Its uppermost position occurs when the side of the wobble plate 21 diametrically opposite the hinge 20 is beneath the piston rod. It is pushed up by the wobble plate and pulled down by the retainer plate to provide a positive drive on both the pumping and suction strokes.

The wobble plate is tilted about the hinge pin 18 by a pivot link 41 pivotally connected by pin 42 to a clevis bracket 40 attached to the upper face of the retainer clevis 23. The other end of link 41 is pivotally connected by pin 43 to the lower end 44 of the meter drive and wobble plate lift shaft 45. The latter is rotatably journaled for rotation in the threaded sleeve 47 by ball bearing 46 and thrust bearing 48. The latter bearing is positioned between the upper edge of the threaded sleeve 47 and the lower face of thrust ring 49, which is fixedly attached to and rotates with the upper end of shaft 45.

The threaded sleeve is threaded in the coaxial, tapped hole 50 of a cylindrical base 51, on which a readout register 52 is mounted. The base and meter may be rotated independently of the housing 1 to effect a threading action between the tapped hole 50 and the threaded sleeve 47. As the threaded sleeve 47 moves upwardly into the tapped hole 50, it raises the shaft 45 and link 41 to tilt the model plate 21 to the angle of tilt desired.

The lower end of the threaded sleeve 47 is received in a cylindrical bore 53 coaxially positioned in the manifold block 54. Rotation of the sleeve is precluded by the key 55 seated in opposed, vertical grooves in the sleeve 47 and the bore 53.

The lower face of the meter housing block 51 preferably has a cylindrical neck 56 rotatably seated in counterbore 57 in the upper face of manifold block 54. It further has an annular flange 58 fitted loosely beneath a retaining ring 59. Thrust gaskets 60 and 61 are preferably provided between the underfaces of the block 51 and its neck 56 and the upper face of manifold block 54 and lower wall of counterbore 57, respectively.

The shaft 45 rotates with the wobble plate 41. It has an axial bore or slot 62 in its upper end which nonrotatably but slidably receives the lower end 63 of the shaft 64. The shaft 64 is the drive shaft for the register 52, which registers the volume of principal fluid which has passed through the metering motor 2.

Secondary fluid to be proportioned relative to the primary fluid is supplied to the proportioning apparatus through the inlet 65 in the hub 66 of the cylinder block 67. A valve block 68 is sandwiched between the cylinder block 67 and the block 54. Secondary fluid entering the inlet 65 is drawn through passage 69 into the manifold ring passage 70, which communicates by takeoff passage 71 with each piston chamber 72. The manifold passage 70 is formed by an annular groove in the wall of counterbore 73 formed at the lower end of bore 74 in the cylinder block 67. A sleeve 75 is tightly seated in the counterbore 73. O-rings 76 function as seals between the contacting faces of the sleeve 75 and the counterbore 73 to preclude fluid loss from the manifold 70.

Each piston rod 35 is reciprocally mounted in a piston chamber head 80 seated in the lower end of each piston chamber 72. The O-rings 81 and 82 seal the lower end of the piston chamber 72 and the piston rod 35 against the escape of secondary fluid. The piston 83 is connected to the piston rod 35 by a ported neck 84, the port of which communicates with the port 85 through the lower wall of the piston 83. On the downward stroke of the piston, secondary fluid flows from the lower end of the piston chamber 72 into the piston past the valve ball 86. On the upward, pumping stroke of the piston, the valve ball 86 seats on the quad-ring ball valve seat 87. A pin 88 retains the valve ball 86 against displacement out of the piston. The piston chamber 72 has a cylindrical, Teflon liner 89.

The valve block 68 has a check valve bore 90 coaxial with each pumping chamber 72. A spring-biased ball check valve 91 seats on the O-ring seal 92 at the bottom of each bore 90.

The check valve permits oneway flow of fluid from each pumping chamber 72 into each bore 90 but precludes return flow while the piston is on its down stroke.

The secondary fluid pumped into each bore 90 enters a manifold ring passage 93 in the lower face of the manifold block 54. The manifold ring passage 93 intersects each of the bores 90. The secondary fluid exits from the ring manifold via the discharge passage 94 in the manifold block 54. The tapped portions of the inlet passage 65 and the outlet passage 94 are coupled to threaded ends of conduits or hoses (not shown).

A relief valve 95 is mounted in a bore 96 in the cylinder block 67 and the valve block 68. This bore intersects at one end the ring manifold 93 and intersects at the other end a passage 97, which in turn intersects the inlet passage 69. Check valve 95 comprises a cylindrical valve body 98 mounted in the bore 96 with O-ring seals 99 in sealing contact between the bore and the cylindrical wall of the valve body. The valve head 100 seats on the frustoconical valve seat 101 under the urging of spring 102, the upper end of which bears against the spider 103. The latter is threadedly mounted on the upper end of the valve stem 104. The check valve 95 opens when the fluid pressure in ring manifold 93 becomes abnormally high, e.g., due to a blockage of secondary fluid downstream of the manifold 93. When the check valve opens, the secondary valve is recycled back to the inlet passage 69, thus preventing excessive pressure build up of the secondary fluid.

The adapter plate 9 and the three blocks 54, 67 and 68 may be held in the illustrated relationship by any suitable means, e.g., by a plurality of posts or rods 105 having taped ends into which are threaded bolts (not shown) extending through aligned bolt holes (not shown) in said plate and blocks. A removable cylindrical cover may be used to close the space therebetween.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A controlled pumping device for accurately maintaining a desired volumetric proportion between two fluids which comprises metering means responsive to the volume flow of a primary fluid, said metering means including rotatable output means rotatable in direct proportion to the volume flow rate of said primary fluid, a wobble plate drive means rotatably driven by said rotatable output means, wobble plate means tiltably mounted on said wobble plate drive means, a piston chamber situated above said wobble plate means, intake and exhaust passage means for receiving and discharging a secondary fluid via said piston chamber, a piston in said piston chamber, piston rod means operably connecting said wobble plate means and said piston for driving said piston as said wobble plate means revolves, wobble plate tilting means operatively connected to said wobble plate means for varying the tilt of said wobble plate means, control means coaxial with the axis of rotation of said wobble plate means for manually operating said wobble plate tilting means to vary the stroke length of said piston in response to the degree of tilt of said wobble plate means, register means for registering the volume of flow of primary fluid driven by shaft means rotatably journaled in said control means, means rotatably mounting said register means on said device, and means operably connecting said register means with said control means for operating said control means upon rotation of said register means.

* * * * *